United States Patent
Yu

[19]

[11] Patent Number: 6,086,356
[45] Date of Patent: Jul. 11, 2000

[54] VALVE DEVICE FOR AN INJECTION NOZZLE USED IN INJECTION MOLDING MACHINE

[75] Inventor: Young-Hee Yu, Seoul, Rep. of Korea

[73] Assignee: Yudo Co., Ltd., Seoul, Rep. of Korea

[21] Appl. No.: 09/111,783

[22] Filed: Jul. 8, 1998

[30] Foreign Application Priority Data

Apr. 6, 1998 [KR] Rep. of Korea .......................... 98-5265

[51] Int. Cl.⁷ .................................................. B29C 45/23
[52] U.S. Cl. ............................................. 425/564; 425/566
[58] Field of Search .................................... 425/562, 563, 425/564, 565, 566

[56] References Cited

U.S. PATENT DOCUMENTS 5,533,882  7/1996  Gessner et al. ......................... 425/564

FOREIGN PATENT DOCUMENTS 96-1163  2/1996  Rep. of Korea .
97-6954  7/1997  Rep. of Korea .

*Primary Examiner*—Tim Heitbrink
*Attorney, Agent, or Firm*—McDermott, Will & Emery

[57] ABSTRACT

A valve device for an injection nozzle in an injection molding machine which includes a piston defined therein with a vertical cylindrical space having a lower portion partially receiving the injection nozzle adapted to inject molten resin into the cavity of a mold, and an upper portion partially receiving a connector adapted to connect the injection nozzle to a cylinder serving to supply molten resin. The piston also has a valve pin carrying portion configured to vertically support a valve pin in such a fashion that the valve pin moves vertically. The valve pin carrying portion extends diametrically across the cylindrical space of the piston. The valve pin carrying portion of the piston is provided at a central portion thereof with a hole for carrying a head of the valve pin in such a manner that the valve pin extends downwardly in a vertical direction. In this valve device, it is possible to not only obtain an optimum stroke of the piston, but also to minimize the size of the valve device. Therefore, the valve device is proper for the molding of small-size resin products.

5 Claims, 3 Drawing Sheets

& 1

VALVE DEVICE FOR AN INJECTION NOZZLE USED IN INJECTION MOLDING MACHINE

BACKGROUND OF THE INVENTION

1. Field of the Invention

The present invention relates to a valve device used in an injection molding machine for producing plastic resin products, and more particularly to such a valve device which includes a piston defined therein with a vertical cylindrical space having a lower portion partially receiving an injection nozzle adapted to inject molten resin into the cavity of a mold, and an upper portion partially receiving a connector adapted to connect the injection nozzle to a cylinder serving to supply molten resin, the piston also having a valve pin carrying portion configured to vertically support a valve pin in such a fashion that the valve pin moves vertically. In this valve device, it is possible to not only obtain an optimum stroke of the piston, but also to minimize the size of the valve device. Therefore, the valve device is proper for the molding of small-size resin products. In addition, the piston has a configuration capable of preventing heat, which is generated from heaters installed to prevent molten resin from being solidified during its feeding, from being directly transferred to packings which are installed to provide a seal effect along inner and outer surfaces of the piston, thereby preventing the packings from being damaged.

2. Description of the Prior Art

Typically, injection molding machines are used in the manufacture of plastic resin products. In such injection molding machines, a resin material is charged into a cylinder which, in turn, melts the charged resin material. The melted resin material is fed to a runner and then injected into the cavity of a mold, consisting of upper and lower mold portions, through an injection nozzle communicating with the runner. After filling the molten resin material in the mold cavity, a resin solidification is carried out. Following the resin solidification, the upper and lower mold portions of the mold are separated from each other to remove a molded product. In such injection molding machines, a resin residue, called a sprue, exists in a portion of the cavity of the mold near the injection port of the injection nozzle after the runner is separated from the mold upon a completion of the filling of the molten resin in the cavity. Such a sprue should be removed by a subsequent process. In order to eliminate such a drawback, a valve device having a configuration capable of eliminating the formation of a sprue has been proposed. For example, such a valve device is disclosed in Korean Utility Model No. 96556 issued to the applicant of the present invention. In the valve device disclosed in the utility model, a cylinder provided with a hydraulically or pneumatically-operating piston is arranged in the runner. A valve pin is coupled to the piston so that it serves to open/close the injection port of an injection nozzle in accordance with a upward/downward movement of the piston.

In this valve device, the hydraulic or pneumatic cylinder is arranged over a manifold, which is disposed in the runner, so that a molten resin is injected into the cavity of a mold through the manifold without using any resin channel. Such a configuration is appropriately used in the case in which a plurality of gates, adapted to inject molten resin into the cavity of the mold, are needed to mold large-size resin products. However, this valve device has a problem in that it is impossible to mold resin products of a small size requiring the use of a mold having a single gate.

In order to solve this problem, another valve device proper for the molding of small-size resin products has been proposed. For example, such a valve device is disclosed in Korean Utility Model No. 116226 (Publication No. 97-6954) issued to the applicant of the present invention. However, this valve device also involves various drawbacks. For example, this valve device is bulky as compared to an injection nozzle used. This is because a hydraulic or pneumatic cylinder, which is included in the valve device to move a valve pin adapted to open and close the injection nozzle, is arranged in one side of the injection nozzle. Furthermore, the valve pin is indirectly connected to a piston included in the hydraulic or pneumatic cylinder via a guide link arranged over the injection nozzle. For this reason, the valve pin may not move in a vertical direction. The valve pin may come into frictional contact with the guide link, thereby causing the guide to be abraded. This nay result in a leakage of molten resin along the abraded guide and a malfunction of the valve pin. For this reason, frequent maintenance and repair is required.

SUMMARY OF THE INVENTION

Therefore, the present invention has been made in view of the above mentioned problems involved in conventional valve devices, and an object of the invention is to provide a valve device which includes a piston having a configuration capable of obtaining an optimum stroke preventing a malfunction of a valve pin adapted to open and close the injection port of an injection nozzle serving to inject molten resin into a mold, minimizing the size of the valve device and preventing heat, which is generated from heaters installed to prevent molten resin from being solidified during its feeding, from being directly transferred to packings which are installed to provide a seal effect along inner and outer surfaces of the piston, thereby preventing the packing from being damaged.

In accordance with the present invention, this object is accomplished by providing a valve device for selectively opening and closing an injection nozzle connected between the cavity of a mold and a cylinder serving to feed a molten resin material to be injected into the cavity of the mold via a connector connected at an upper end thereof to a lower end of the cylinder and at a lower end thereof to an upper end of the injection nozzle, the connector having a resin channel for feeding the molten resin material from the cylinder to a vertical injection passage defined in the injection nozzle, the injection nozzle having an injection port formed at a lower end of the injection passage and connected to the cavity of the mold, the injection port being selectively opened and closed by a valve pin received in the injection passage and controlled by the valve device, comprising: a vertically-extending hollow cylindrical housing having a top plate mounted on an upper end of the housing and provided with an upper opening, and a bottom plate mounted on a lower end of the housing, the cylindrical housing being defined therein with a vertical cylindrical space completely receiving the connector in such a manner that the upper end of the connector, which is coupled to the cylinder, is positioned at the upper opening, while receiving at least an upper portion of the injection nozzle; a cylindrical piston sealably fitted in the housing around both the connector and the injection nozzle in such a manner that it reciprocates vertically along the housing between the top and bottom plates, the cylindrical piston having a vertical cylindrical portion defined therein with a vertical cylindrical space partially receiving both the connector and the injection nozzle, and a peripheral piston portion selectively subjected at upper and lower surfaces thereof to a hydraulic or pneumatic pressure to reciprocate the piston; valve pin carrying means adapted to carry the valve pin while being carried by the cylindrical piston in such a manner that it moves vertically in accordance with the vertical reciprocation of the piston, thereby vertically moving the valve pin; and means for allowing the valve pin carrying means to move vertically when the piston reciprocates vertically.

The valve pin carrying means may comprise a bar-shaped member integrally formed with the piston in such a manner that it extends diametrically across the cylindrical space, the bar-shaped member being provided at a central portion thereof with a hole for carrying a head of the valve pin in such a manner that the valve pin extends downwardly in a vertical direction. The means for allowing the valve pin carrying means to move vertically may comprise a groove formed at the lower end of the connector in such a manner that it extends diametrically, the groove receiving the bar-shaped member and having a depth not less than a vertical stroke length of the bar-shaped member.

BRIEF DESCRIPTION OF THE DRAWINGS

Other objects and aspects of the invention will become apparent from the following description of embodiments with reference to the accompanying drawings in which.

DESCRIPTION OF THE PREFERRED EMBODIMENTS

Figure 1:
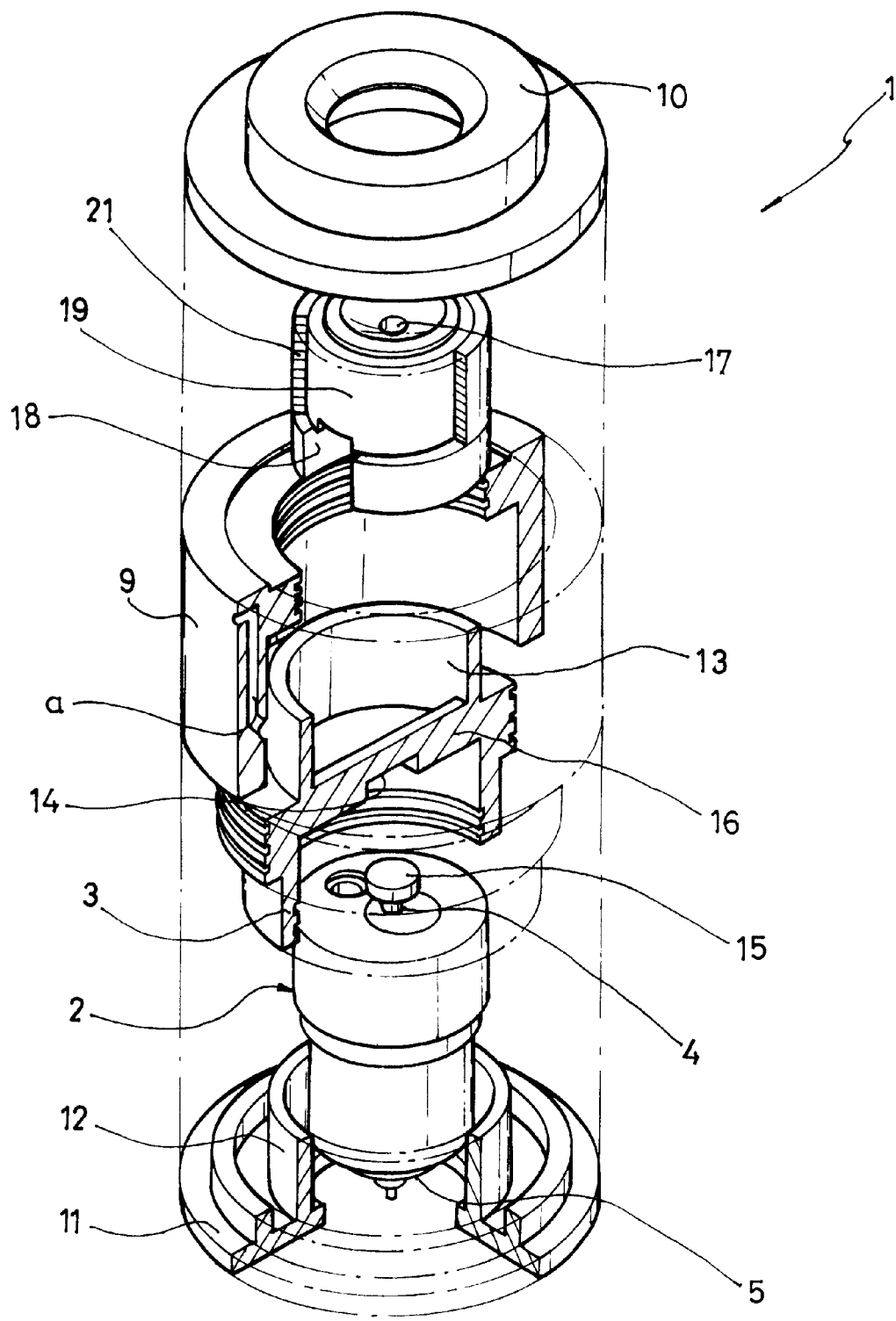
FIG. 1 is an exploded perspective view illustrating a valve device according to the present invention.
Figure 2:
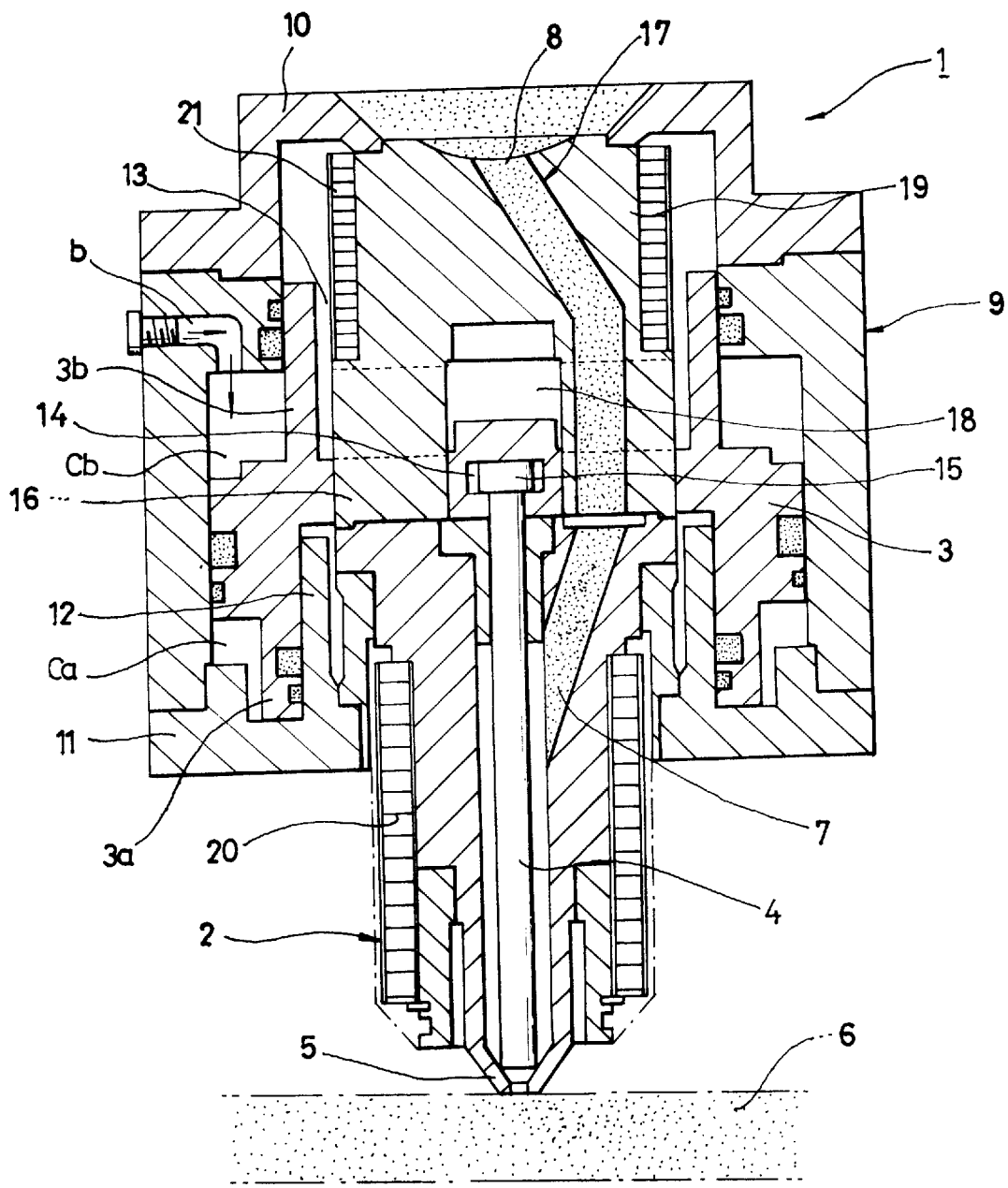
FIG. 2 is a cross-sectional view of the valve device, illustrating a state in which an injection nozzle is closed.
Figure 3:
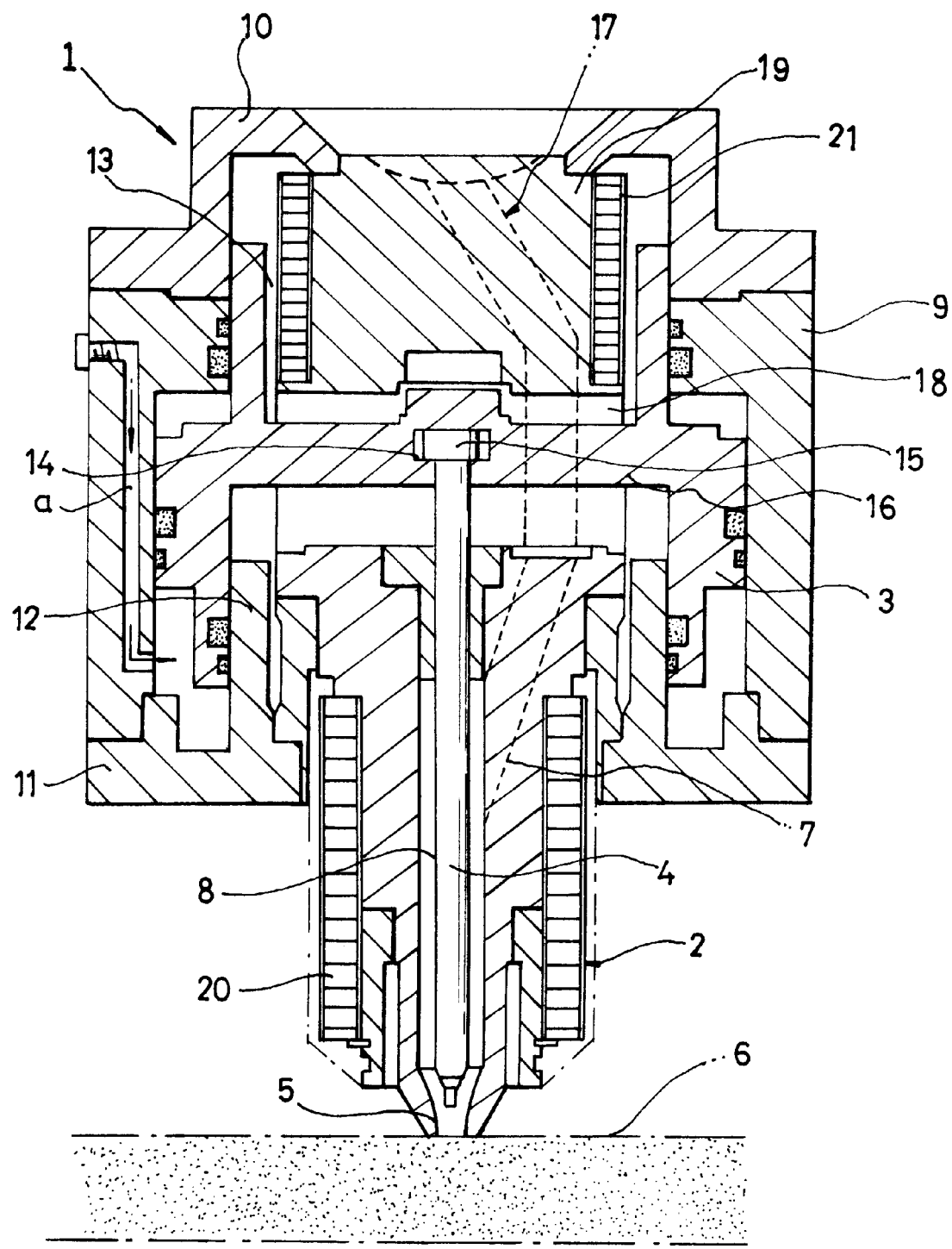
FIG. 3 is a cross-sectional view of the valve device, illustrating a state in which an injection nozzle is opened.

Referring to FIGS. 1 and 2, a valve device according to the present invention is illustrated, respectively.

As shown in FIGS. 1 and 2, the valve device of the present invention, which is denoted by the reference numeral 1, is connected to a cylinder (not shown) serving to feed molten resin to be injected into the cavity of a mold. The valve device 1 is adapted to selectively open and close an injection nozzle 2 connected between the cylinder and the cavity, denoted by the reference numeral 6, of the mold via a connector 19 connected at an upper end thereof to a lower end of the cylinder and at a lower end thereof to an upper end of the injection nozzle 2. The connector has a resin channel 17 for feeding the molten resin material from the cylinder to a vertical injection passage defined in the injection nozzle 2. The injection nozzle has an injection port 5 formed at a lower end of the injection passage and connected to the cavity 6 of the mold. The injection port is selectively opened and closed by a valve pin 4 received in the injection passage and controlled by the valve device.

The valve device 1 includes a hollow cylindrical housing 9. A top plate 10 and a bottom plate 11 are mounted on the upper and lower ends of the housing 9, respectively. The top plate 10 is connected at its upper end to the cylinder. In the illustrated case, the top plate 10 has a hollow cylindrical construction including a cylindrical space having an upper opening and a lower opening. The cylindrical space of the top plate 10 communicates with the cylinder at its upper opening and communicates with a cylindrical space defined in the housing 9 at its lower opening. The lower opening of the top plate 10 has the same diameter as an upper opening of the housing 9 so that the top plate 10 has an inner surface continued to the inner surface portion of the housing 9 defining an upper opening of the housing 9. The bottom plate 11 has a central opening, and a cylindrical guide/shield extension 12 upwardly extending from the upper surface of the lower plate 11 into the cylindrical spice of the housing 9 around the central opening. The infection nozzle 2 is arranged in a fixed state in such a manner that its upper portion is surrounded by the guide/shield extension 12.

The piston 3 has a cylindrical construction and is sealably fitted in the interior of the housing 9 in such a manner that it reciprocates vertically along the housing 9 between the top and bottom plates 10 and 11. The piston 3 has a cylindrical downward extension 3a extending downwardly from the lower surface of the piston 3, and a cylindrical upward extension 3b extending upwardly from the upper surface of the piston 3. The downward extension 3a is sealably fitted around the guide/shield extension 12 of the bottom plate 11 in such a manner that it reciprocates vertically along the guide/shield extension 12. The piston 3 is defined with a vertical cylindrical space 13 therein by the downward and upward extensions 3a and 3b. The upward extension 3b is sealably fitted in the upper opening of the housing 9 in such a manner that it reciprocates vertically along the continuous inner surfaces of the upper opening of the housing 9 and the cylindrical space of the top plate 10. The piston 3 also has a diametrically-extending bar-shaped valve pin carrying portion 16 having a central pin head carrying hole 14. A valve pin 4, which extends vertically through a vertical injection passage defined in the injection nozzle 2, is engaged at its head with the central pin head carrying hole 14 of the piston 3. In the drawings, the head of the valve pin 4 is denoted by the reference numeral 15. As the piston 3 reciprocates vertically, the valve pin 4 moves vertically in the injection passage of the injection nozzle 2, thereby opening and closing the injection port 5 of the injection nozzle 2.

A pair of hydraulically or pneumatically-pressurized fluid chambers Ca and Cb are also provided to vertically reciprocate the piston 3. The chamber Ca is defined in the lower portion of the housing 9 by the inner surface of the housing 9, the peripheral lower surface of the piston 3 and the outer surface of the downward extension 3a. The chamber Cb is defined in the upper portion of the housing 9 by the inner surface of the housing 9, the peripheral upper surface of the piston 3 and the outer surface of the upward extension 3b. In order to supply a hydraulically or pneumatically-pressurized fluid into the chambers Ca and Cb or to discharge the fluid out of the chambers Ca and Cb, a pair of fluid passages a and b are provided at the housing 9, respectively. Each of the fluid passages a and b is connected between an associated one of the chambers Ca and Cb and a hydraulic or pneumatic system (not shown).

In the interior of the top plate 10, a connector 19 is fixedly mounted in such a manner that its upper end is fixed to the upper end of the top plate 10. The upper end of the connector 19 is exposed through the upper opening of the top plate 10 so that it is connected to the cylinder. The connector 19 extends downwardly into the cylindrical space 13 of the piston 3 so that it has a lower end extending downwardly beyond the bar-shaped valve pin carrying portion 16 of the piston 3. To this end, the connector 19 is provided at its lower surface with a diametrically-extending groove 18 adapted to receive the valve pin carrying portion 16 of the piston 3. The lower end of the connector 19 is fixedly connected to the upper end of the injection nozzle 2 received in the cylindrical space 13 of the piston 3 through the bottom plate 11. Accordingly, the injection nozzle 2 is maintained in a fixed state. The groove 18 of the connector 19 has a depth not less than the vertical stroke length of the valve pin carrying portion 16 of the piston 3. In the illustrated case, the groove 18 of the connector 19 has a depth corresponding to the vertical stroke length of the valve pin carrying portion 16. The connector 19 is also provided with a resin channel 17 extending between the upper and lower ends of the connector 19. The resin channel 17 communicates with the upper end of a resin channel 7 formed in the injection nozzle 2. The lower end of the resin channel 7 is open to the vertical injection passage of the injection nozzle 2. Accordingly, molten resin can be fed from the cylinder to the injection port 5 of the injection nozzle 2 via the resin channel 17 and 7 respectively defined in the connector 19 and injection nozzle 2, and the injection passage of the injection nozzle 2.

By such an arrangement, molten resin fed to the injection port 5 is selectively injected into the cavity 6 of the mold through the injection port 5 which is opened and closed by the valve pin 4 vertically reciprocating in accordance with the reciprocation of the piston 3.

In the drawings, the reference numerals 20 and 21 denote heaters arranged around the connector 19 and injection nozzle 2, respectively. The heaters 20 and 21 serve to prevent molten resin supplied from the cylinder from being solidified during its feeding.

Now, an operation of the valve device having the above-mentioned arrangement according to the present invention will be described.

Where it is desired to inject a molten resin material supplied from a cylinder into a mold using the valve device of the present invention, the injection port 5 of the injection nozzle 2 is first coupled to the cavity 6 of the mold. At this time, the valve device is in its initial state in which the piston 3 is maintained at its lower position closing the injection port 5. In this state, a molten resin material 8 from the cylinder is fed to the injection port 5 of the injection nozzle 2 via the resin channel 17 and 7 respectively defined in the connector 19 and injection nozzle 2, and the injection passage of the injection nozzle 2. However, the molten resin material 8 can not be injected into the cavity 6 of the mold because the injection port 5 is closed by the valve pin 4. In this state, a pressurized fluid from the hydraulic or pneumatic system (not shown) is then supplied into the chamber Ca via the fluid passage a. The pressurized fluid introduced in the chamber Ca applies a pressure to the lower surface of the piston 3, thereby causing the piston 3 to move upwardly. At this time, a fluid, which may be present in the chamber Cb, is discharged out of the chamber Cb into the hydraulic or pneumatic system. As the piston 3 moves upwardly, the valve pin 4 mounted to the valve pin carrying portion 16 of the piston 3 also moves upwardly. As a result, the injection port 5 of the injection nozzle 2 is open. Accordingly, the molten resin material 8 is injected into the cavity 6 of the mold. After completing the injection of the molten resin material 8 into the mold, a pressurized fluid is supplied from the hydraulic or pneumatic system (not shown) into the chamber Cb via the fluid passage b. The pressurized fluid introduced in the chamber Cb applies a pressure to the upper surface of the piston 3, thereby causing the piston 3 to move downwardly. At this time, the fluid, which is present in the chamber Ca, is discharged out of the chamber Ca into the hydraulic or pneumatic system. As the piston 3 moves downwardly, the valve pin 4 moves downwardly, thereby closing the injection port 5 of the injection nozzle 2. Accordingly, the molten resin material 8 is injected, no longer, into the cavity 6 of the mold.

The vertical movement of the piston 3 is carried out in such a fashion that it is in contact with the upper end of the housing 9 at its upward extension 3b and in contact with the guide/shield extension 12 of the bottom plate 11 at its downward extension 3a. Accordingly, heat, which is generated from the heaters 20 and 21 to prevent the molten resin material 8 from being solidified during its feeding, is not directly transferred to packings which are installed to provide a seal effect along the inner and outer surfaces of the piston 3. Therefore, it is possible to prevent the packings from being damaged.

Since the valve pin 4 is vertically supported by the valve pin carrying portion 16 of the piston 3 in such a manner that it moves vertically, the stroke of the piston 3 is directly transmitted to the valve pin 4. In particular, the injection nozzle 2 is partially received in the cylindrical space 13 of the piston 3. Accordingly, it is possible to optimize or minimize the stroke of the piston 3. It is also possible to minimize the size of the value device.

As apparent from the above description, the present invention provides a valve device including a piston defined therein with a cylindrical space having a lower portion partially receiving an injection nozzle adapted to inject molten resin into the cavity of a mold, and an upper portion partially receiving a connector adapted to connect the injection nozzle to a cylinder serving to supply molten resin. The piston also has a valve pin carrying portion configured to vertically support a valve pin in such a fashion that the valve pin moves vertically. Accordingly, it is possible to not only obtain an optimum stroke of the piston, but also to minimize the size of the valve device. Therefore, the valve device of the present invention is proper for the molding of small-size resin products. In addition, the piston reciprocates vertically while being in contact with the upper end of a housing at its upward extension and in contact with a guide/shield extension of a bottom plate at its downward extension. Accordingly, heat, which is generated from heaters installed to prevent molten resin from being solidified during its feeding, is not directly transferred to packings which are installed to provide a seal effect along the inner and outer surfaces of the piston. Therefore, it is possible to prevent the packings from being damaged.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A valve device for selectively opening and closing an injection nozzle connected between the cavity of a mold and a cylinder serving to feed a molten resin material to be injected into the cavity of the mold via a connector connected at an upper end thereof to a lower end of the cylinder and at a lower end thereof to an upper end of the injection nozzle, the connector having a resin channel for feeding the molten resin material from the cylinder to a vertical injection passage defined in the injection nozzle, the injection nozzle having an injection port formed at a lower end of the injection passage and connected to the cavity of the mold, the injection port being selectively opened and closed by a valve pin received in the injection passage and controlled by the valve device, comprising:

a vertically-extending hollow cylindrical housing having a top plate mounted on an upper end of the housing and provided with an upper opening, and a bottom plate mounted on a lower end of the housing, the cylindrical housing being defined therein with a vertical cylindrical space completely receiving the connector in such a manner that the upper end of the connector, which is coupled to the cylinder, is positioned at the upper opening, while receiving at least an upper portion of the injection nozzle;

a cylindrical piston reciprocatively disposed within the housing between the top and bottom plates, said piston having an axially upward extending unitarily formed annular first wall portion and an axially downward extending unitarily formed annular second wall portion which define therein a vertical cylindrical space partially receiving both the connector and the injection nozzle, the first wall portion having an external peripheral surface in sliding contact with a portion of the housing to define a first chamber, and the second wall portion, which is radially superior to the first wall portion, having an external peripheral surface in sliding contact with an external peripheral wall surface of the housing and an inner peripheral wall surface in sliding contact with an annular guide/shield extension which is unitarily formed with the bottom plate, to define a second chamber, said piston further having a peripheral piston portion selectively subjected at upper and lower surfaces thereof to a hydraulic or pneumatic pressure respectively prevailing in the first and second chambers; and valve pin connection arrangement adapted to connect the valve pin to said piston in such a manner that it reciprocates in accordance with the reciprocation of the piston.

2. The valve device according to claim 1, wherein the valve pin connection means comprises a bar-shaped member unitarily formed with the piston in such a manner that it extends diametrically through the cylindrical space, the bar-shaped member being provided at a central portion thereof with a diametrically extending groove for receiving a head of the valve pin in such a manner that when the pin head is slidingly received in the groove it is connected with the piston for synchronous reciprocal movement therewith and so that the valve pin extends axially downwardly from the piston.

3. The valve device according to claim 2, wherein the means for allowing the valve pin carrying means to move vertically comprises a groove formed at the lower end of the connector in such a manner that it extends diametrically, the groove receiving the bar-shaped member and having a depth not less than a vertical stroke length of the bar-shaped member.

4. The valve device according to claim 1, further comprising: a first heater disposed about a lower end portion of the injection nozzle to heat the injection nozzle and prevent solidification of molten resin which is in a first passage formed in the injection nozzle.

5. The valve device according to claim 1, further comprising a second heater disposed about a connector member which is disposed against the upper plate and through which a second passage through which molten resin is supplied and which leads to the first passage, is formed.

* * * * *